United States Patent Office 3,536,270
Patented Oct. 27, 1970

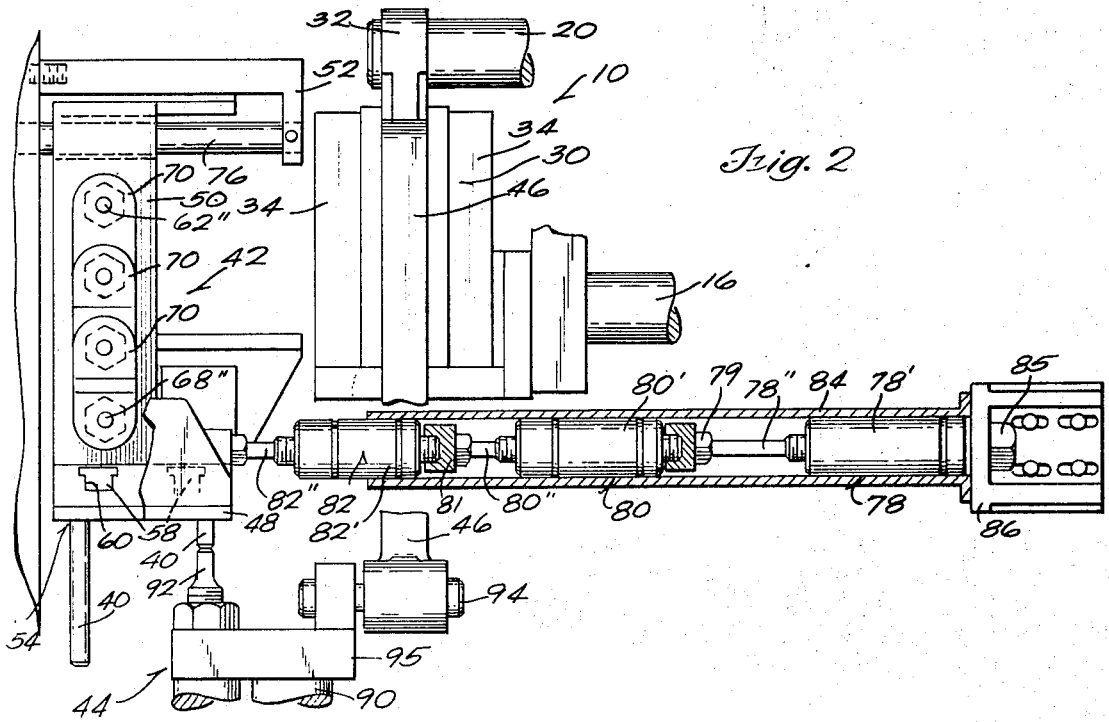
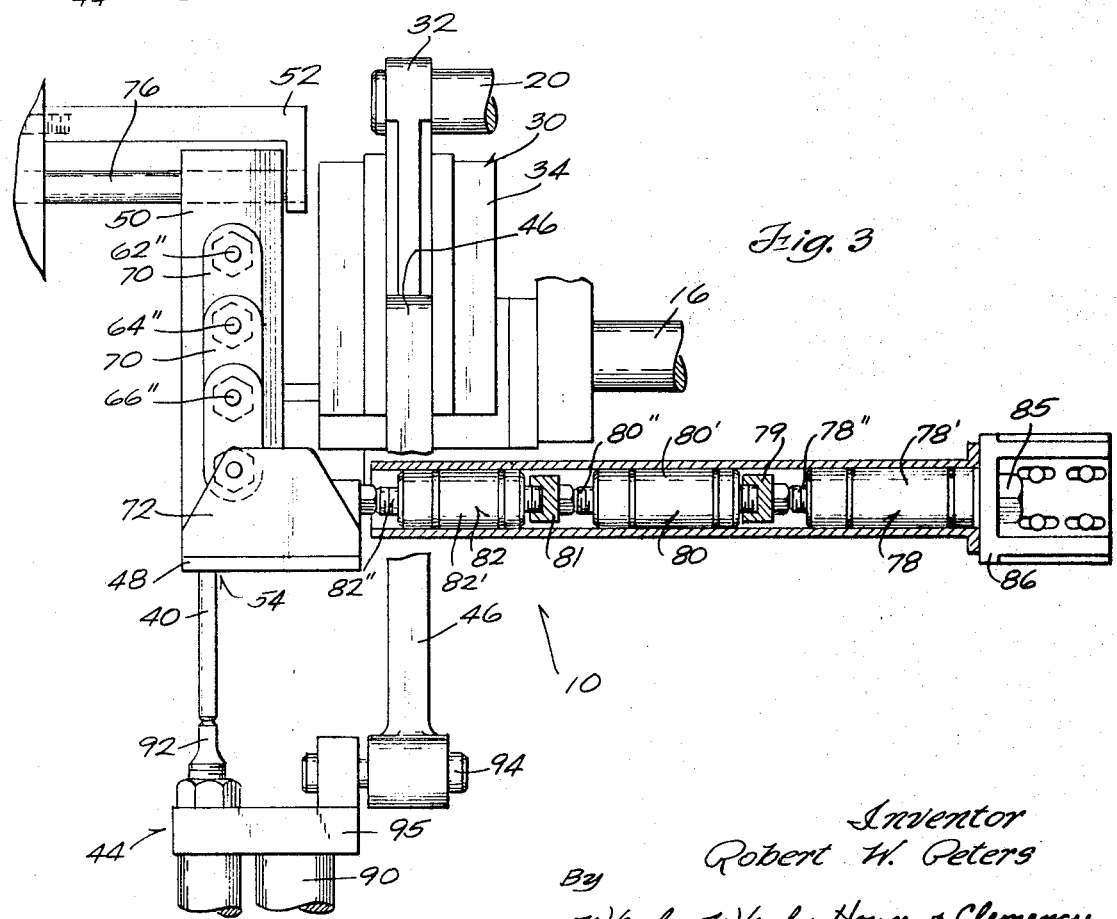

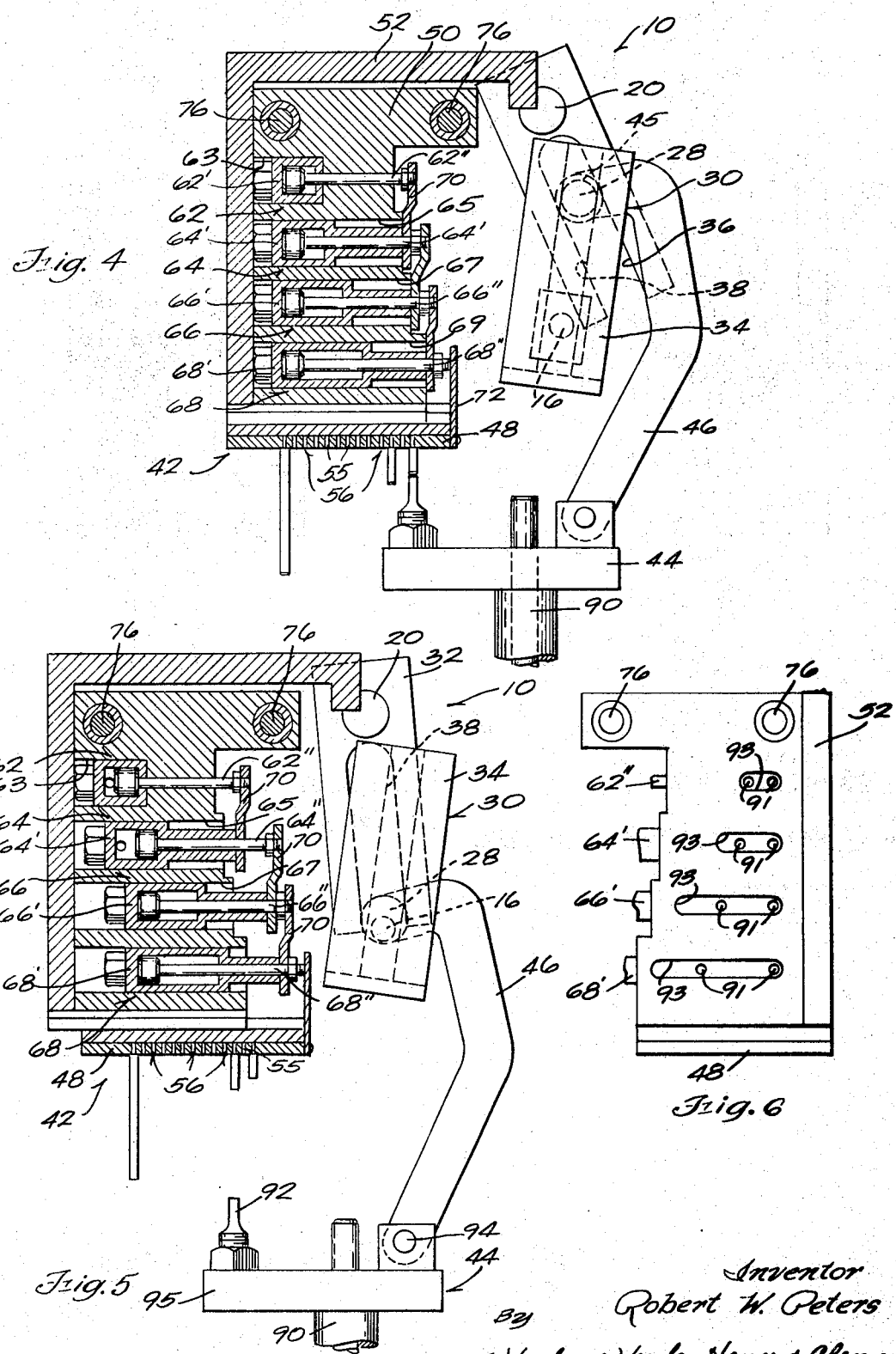

3,536,270
SPAN CONTROL FOR A STATOR
WINDING MACHINE
Robert W. Peters, Menomonee Falls, Wis., assignor to
Lincoln Tool and Manufacturing Company, Milwaukee, Wis.
Filed Dec. 4, 1967, Ser. No. 687,674
Int. Cl. H02k 15/09; F16h 21/42
U.S. Cl. 242—1.1                                         7 Claims

ABSTRACT OF THE DISCLOSURE

Disclosed herein is a span control mechanism to vary the amount of rotary motion transferred from a constantly oscillated rock shaft to the shuttle of a stator winding machine wherein the control mechanism includes a stop assembly which is slectively moveable to position one of a plurality of different length pins at a predetermined position and a support base which is moveable into engagement with the selected pin to determine the operative position of a motion transfer pin relative to the constantly oscillated shaft and the shuttle.

BACKGROUND OF THE INVENTION

Stator winding machines of the type contemplated herein are used to automatically wind coils in selected pairs of slots in a stator supported on the machine. A winding head, secured to the outer end of a shuttle in the machine, is moved through the bore of the stator to lay wire in one of the slots in the stator. The winding head is rotated at the end of each movement and returned through the bore to lay wire in another slot and then rotated back to its original position to repeat the cycle. A number of operatively associated mechanisms are used to reciprocate and oscillate the shuttle through this cycle until the coil winding is completed and then the amount of rotary motion or span at the end of each movement is automatically varied to wind the coil wire through the next selected pair of slots in the stator. Stator winding machines of this type are shown in Gorski et al. Pat. No. 3,052,418 wherein a span control mechanism is disclosed which is capable of a limited number of variations in span. The stator winding machine is therefore limited to winding stators that have the slots angularly spaced in accordance with the limited number of spans available in the machine.

SUMMARY OF THE INVENTION

In the present invention a span control mechanism for a stator winding machine is disclosed which provides an increased number of variations in the amount of rotary motion or span transferred from a constantly oscillated rock shaft to the shuttle. The coils for a variety of stators having slots spaced at different angular distances can be wound on a stator winding machine using this span control mechanism. The span control mechanism includes a motion transferring pin which is supported for pivotal motion on an adjustably positionable support and is moveable with the support base to different positions relative to the oscillating rock shaft. The position of the support base is determined by selecting one of a number of different length span pins and moving the selected pin to a position where the support base can be brought into engagement with the selected span. Over one hundred different length span pins may be supported on the pin plate with each span pin providing a different amount of shuttle oscillation. Once the angular variation of the slots in a particular stator to be wound is determined, it is only necessary to select the required span pins in order to wind the referenced coils in the stator.

Other objects and advantages will become more apparent from the following description when read in connection with the accompanying drawings in which:

FIG. 2 is a side view partly in section of a stator winding machine showing the the stop assembly for the span control mechanism in the forward position.

FIG. 3 is a view showing the stop plate for the span control mechanism of FIG. 2 in the rearward position.

FIG. 4 is a front end view of the span adjustment mechanism showing the stop plate moved completely to the left.

FIG. 5 is a front end view of the span adjustment mechanism showing the stop plate moved part way to the right.

FIG. 6 is a rear view of a part of the control block for the stop plate in the span adjustment mechanism.

DESCRIPTION OF THE PREFERRED EMBODIMENT

Figure 1:
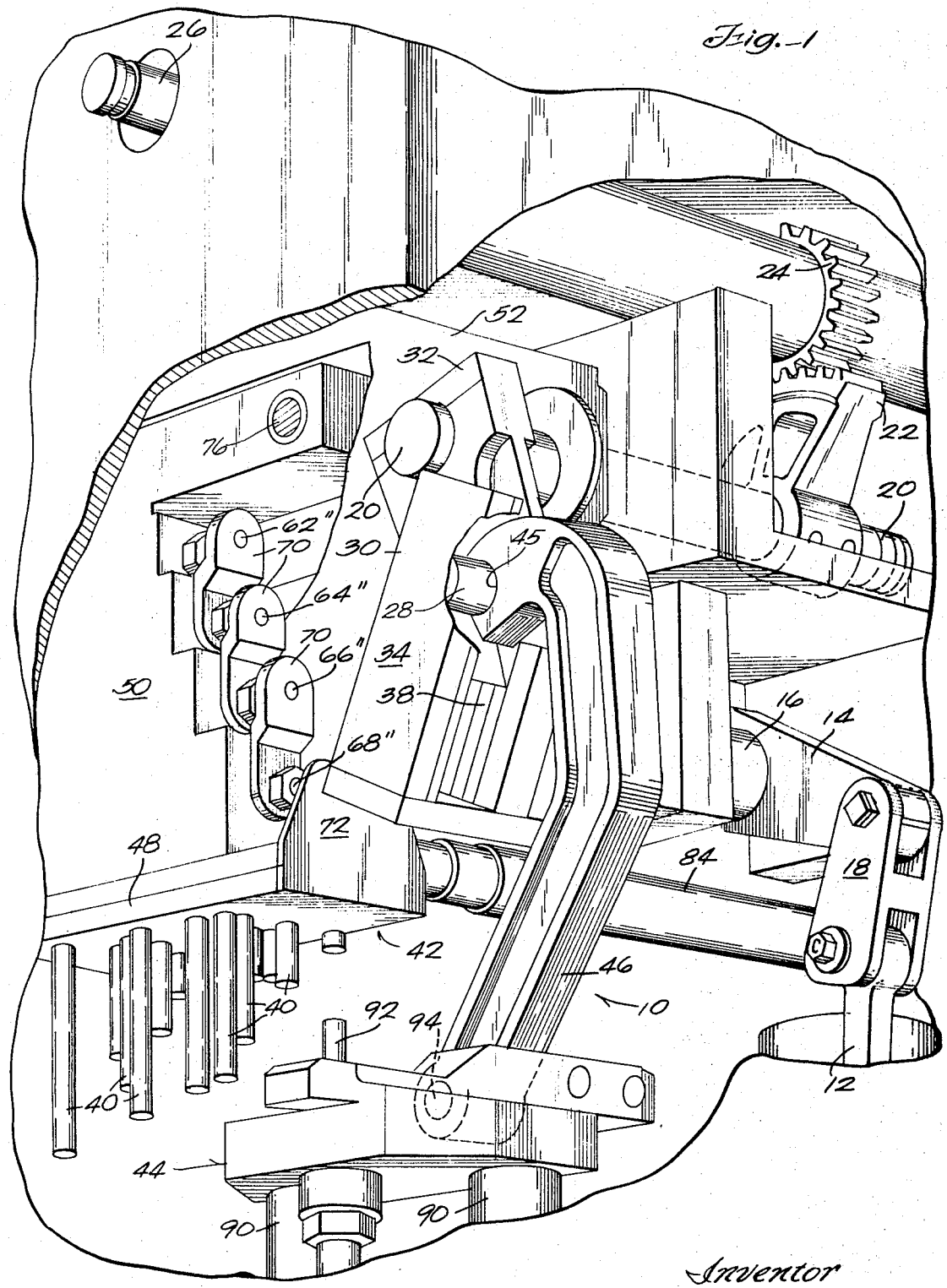
FIG. 1 is a perspective view of a part of a stator winding machine broken away to show the span control mechanism for the shuttle.

The span control mechanism or device 10 of the present invention can be used in a stator winding machine substantially similar to the stator winding machine shown in the Gorski et al. Patent. As disclosed therein a winding head is secured to the end of a shuttle and is reciprocated and oscillated in a cyclic manner through the bore of a stator mounted on the machine to lay wire for the stator coils in predetermined pairs of slots in the stator. The oscillatory motion of the winding head is produced by a mechanism that is driven off of the main drive cam for the machine.

The oscillatory mechanism disclosed herein includes (as shown in FIG. 1) an actuating rod 12 which is mounted to reciprocate in response to the motion of a main drive cam such as shown in the Gorski patent. The upper end of the actuating rod 12 is connected to a lever 14 on a rock shaft 16 by a connecting link 18 to produce a constant rocking motion in the rock shaft 16. The motion of the rock shaft 16 is imparted by the improved span control mechanism disclosed herein to a transfer shaft 20 which has a gear segment 22 in mesh with a gear 24 on the shuttle 26.

The amount of rotary motion or span of motion of the shuttle will depend on the position of a motion transfer pin 28 with respect to a first lever in the form of a grooved block 30 secured to the end of the rock shaft 16 and a second lever 32 secured to the end of the transfer shaft 20. The motion transfer pin 28 is positioned in a slot 36 in the lever 32 and extends into grooves 38 in the legs 34 of the block 30. When the transfer pin 28 is moved toward the transfer shaft 20, the amount of motion of the transfer shaft will increase and movement of the transfer pin away from the transfer shaft 20 will decrease the amount of motion transferred.

The span control mechanism or device 10 is capable of positioning the transfer pin 28 at one of over one hundred positions between the rock shaft 16 and the transfer shaft 20. The span control mechanism includes a plurality of span pins 40 of different length carried by a stop assembly 42 which is selectively moveable to position one of the span pins 40 in the path of motion of a support base 44 to determine the operative position of the support base.

The means for supporting the transfer pin 28 includes a rock arm 46 pivotally mounted on a pin 94 on the support base 44. The upper end of the rock arm 46 is bifurcated to straddle lever 32 between the legs 34 of the grooved block 30. The transfer pin 28 is carried in an aperture 45 in the rock arm 46 so that the operative position of the support base will also determine the operative position of the transfer pin 28 relative to the transfer shaft 20 and rock shaft 16.

The stop assembly 42 is moveable laterally and longitudinally to position one of the span pins 40 in the path of motion of the support base 44. A pin plate 48 mounted for longitudinal movement (FIG. 4) relative to a cylinder block 50 which is mounted for lateral movement (FIG. 2) on a pair of shafts 76 on a bracket 52. The pin plate 48 has a number of holes 55 which are arranged in longitudinal rows 54 and lateral rows 56. In the present embodiment there are eight longitudinal rows and thirteen lateral rows providing one hundred and four holes 55. Span pins 40, each of a different length, are positioned in the holes with each pin being selected to correspond to a known angular distance in a specific stator. Each of the lateral and longitudinal rows of holes are spaced one-half inch apart; however, any other spacing may be used. It should be noted that the length of the span pins 40 decreases from left to right in both FIGS. 2 and 4 to allow for sufficient clearance around support plate 95.

FIGS. 4 and 5 show the means for moving the pin plate 48 longitudinally relative to the cylinder block 50. The pin plate 48 is secured to the bottom of the cylinder block 50 by a pair of T bars 58 slideably positioned in corresponding grooves 60 in the cylinder block 50. The pin plate 48 is moved longitudinally by a set of four interconnected air actuated double acting cylinders 62, 64, 66 and 68 positioned in holes 63, 65, 67 and 69, respectively, in cylinder block 50. The cylinders 62, 64, 66 and 68, will respectively provide one half, one, two, and two and a half inches of motion which will cumulatively provide thirteen one half inch steps of motion for the pin plate 48.

As seen in FIG. 4, the cylinder head 62' for cylinder 62 is shown seated in hole 63 with piston rod 62" projecting from the cylinder block. An offset plate 70 is connected to the end of piston rod 62" and to the cylinder head 64' of cylinder 64. When cylinder 62 is actuated, piston rod 62" will move one half inch, moving cylinder head 64' a corresponding amount in hole 65. A similar offset plate 70 is connected to the end of piston rod 64" and to the cylinder head 66' of cylinder 66. Any movement of the piston rod 64" will produce a corresponding motion in cylinder head 66'. An offset plate 70 is connected to piston rod 66" and to cylinder head 68', and the piston rod 68" is connected to a slide plate 72 which is secured to the pin plate 48. With this arrangement any motion of a piston rod will be transferred to each of the offset plates 70 in the remaining sequence as well as slide plate 72 to produce a corresponding motion in pin plate 48. In FIG. 5 cylinders 62 and 64 have both been activated producing one and one half inches of motion, i.e., cylinder 62, one half inch and cylinder 64, one inch, with a corresponding movement of one and one half inches in the pin plate 48. This motion of pin plate 48 will move the third row of lateral holes 56 into operative alignment with the support base 44. The air lines 91 for the cylinders are connected to the cylinder heads through slots 93 in the cylinder block (FIG. 6).

In order to move pin plate 48 laterally, FIGS. 2 and 3, to align one of the longitudinal rows 54 of holes 55 with the support base, the cylinder block 50 is mounted for sliding movement on shafts 76 in bracket 52. The cylinder block is moved by a set of three air actuated double acting cylinders 78, 80 and 82 which are axially aligned in a support tube 84 connected to a support bracket 86. The three air cylinders are connected to provide seven steps of motion. The cylinder head 78' is connected to the support bracket 86 by a nut 85 and the piston rod 78" of cylinder 78 is connected directly to cylinder head 80' of cylinder 80 by an adaptor 79. The piston rod 80" of cylinder 80 is connected to cylinder head 82' of cylinder 80 by adaptor 81 and the piston rod 82" is connected to cylinder block 50. Air cylinder 78 will provide two inches of motion, air cylinder 80, one inch and air cylinder 82, one half inch of motion. When one or more of the air cylinders are activated, the cylinder block 50 will be moved correspondingly. Referring to FIG. 2 it will be noted that all of the cylinders have been actuated aligning one of the outside rows 54 of holes 55 on pin plate 48 with the support base.

In FIG. 3 all of the piston rods have been retracted moving the row 54 of holes 55 on the other side of the pin plate 48 into alignment with the support base.

The support means or base 44 is moved toward and away from the stop assembly 42 by a pair of air actuated double acting cylinders 90, FIG. 4, which are connected to the underside of base plate 95. The air cylinders 90 are actuated to move the base plate 95 away from the stop assembly 42 to an inoperative position. After the stop assembly has been moved to align a predetermined span pin 40 with the base plate 95, the air cylinders are reversed to move the support base toward an operative position until the motion of the base plate is stopped by the engagement of a stop pin 92 on base plate 95 with the preselected span pin 40.

In operation, and after a stator has been locked in position in the machine, the air cylinders 90 are actuated to move the support base 44 away from the stop assembly 42. This movement of the support base will move the transfer pin 28 to the bottom of grooves 38 in block 30. The span required to wind a coil in the first pair of slots in the stator is selected with a corresponding actuation of the proper air cylinders 62, 64, 66 and 68 to align the lateral rows 56 (FIG. 5) and the proper air cylinders 78, 80 and 82 to align the longitudinal rows 54 in which the selected span pin 40 is located. The air cylinders 90 are reversed moving the support base 44 toward the stop assembly until stop pin 92 engages the selected span pin 40.

The air cylinders are all double acting type cylinders which can be controlled from a circuit similar to the circuit shown in the Gorski et al. patent. A counter is used to control the number of windings in each coil and on completion of a coil, the counter will automatically turn off the machine or actuate the next selected air cylinders to align the span pin for the next coil to be wound on the stator.

What is claimed is:

1. A stator winding machine comprising a frame, a shuttle movably mounted on said frame, a transfer shaft movably mounted on said frame and operatively connected to oscillate said shuttle, a rock shaft movably mounted on said frame and for oscillation through a fixed angular range, a first lever secured to said transfer shaft, a second lever secured to said rock shaft, a transfer pin interconnecting said first and second levers, means supporting said transfer pin for rocking movement about an adjustably located pivot, a stop assembly on said frame and having a plurality of span pins of different length and being selectively movable to locate one of said span pins in a position to engage said means supporting said transfer pin, a first set of air cylinders mounted on said frame and interconnected to move said span pins in one direction, and a second set of air cylinders mounted on said frame to move said span pins in a second direction, whereby to adjustably locate said pivot pin to vary the amount of angular motion transferred from said rock shaft to said transfer shaft.

2. A stator winding machine comprising a frame, a shuttle movably mounted on said frame, a transfer shaft movably mounted on said frame and operatively connected to oscillate said shuttle, a rock shaft movably mounted on said frame for oscillation through a fixed angular range, a first lever secured to said transfer shaft, a second lever secured to said rock shaft, a transfer pin interconnecting said first and second levers, means supporting said transfer pin for rocking movement about an adjustably located pivot, a stop assembly on said frame and having a plurality of span pins of different length and being selectively movable to locate one of said span pins in a position to engage said means supporting said transfer pin, said stop assembly also including a cylinder block mounted for lateral motion on said frame and having a pin plate mounted for longitudinal motion on the block, said span pins being mounted in a plurality of longitudinal and lateral rows on said pin plate, a first set of air cylinders carried by said cylinder block and interconnected to move said pin plate relative to said cylinder block, and a second set of air cylinders on said frame to move said cylinder block relative to said frame, whereby to adjustably locate said pivot pin to vary the amount of angular motion transferred from said rock shaft to said transfer shaft.

3. A stator winding machine comprising a frame, a shuttle mounted for oscillatable movement on said frame, a rock shaft mounted on said frame about a first fixed axis for oscillatory movement through a given angular range, and means for oscillating said shuttle through a variable angular range in response to oscillation of said rock shaft through said given angular range, said shuttle oscillating means including a transfer pin operatively connecting said shuttle and said rock shaft, a member movably supporting said transfer pin, and means on said frame including a plurality of span pins of differing lengths selectively engageable with said movable transfer pin supporting member for adjustably locating said transfer pin supporting member to variably locate said transfer pin relative to said shuttle and said rock shaft.

4. A stator winding machine according to claim 3 wherein said span pins are of different length and are selectively movable to locate a selected one of said span pins in a position to engage said transfer pin supporting member.

5. A stator winding machine comprising a frame, a shuttle mounted for oscillatable movement on said frame, a rock shaft mounted on said frame about a first fixed axis for oscillatory movement through a given angular range, and means for oscillating said shuttle through a variable angular range in response to oscillation of said rock shaft through said given angular range, said shuttle oscillating means including a first lever operatively connected to said rock shaft for rocking movement with said rock shaft about said first fixed axis, a second lever operatively connected to said shuttle for pivotal movement on said frame about a second fixed axis, a transfer pin operatively connecting said first and second levers, a member movably supporting said transfer pin, and means on said frame including a plurality of span pins of differing lengths selectively engageable with said movable transfer pin supporting member for adjustably locating said transfer pin supporting member to variably locate said transfer pin relative to said first and second axis.

6. A span control mechanism for varying the amount of oscillatory motion of a shuttle in a stator winding machine, said mechanism comprising a frame, a shuttle oscillatably supported on said frame, a rock shaft supported on said frame for oscillation through a fixed angular range, a plurality of span pins of different lengths movably mounted on said frame, means on said frame for selectively positioning said pins at a predetermined location in one plane normal to the length of said span pins, means supported on said frame and movable normal to said plane and into engagement with the selected one of said span pins, and a transfer pin carried by said last mentioned movable means and operatively connected to said shuttle and said rock shaft.

7. A span control mechanism according to claim 6 wherein said plurality of span pins includes aligned lateral and longitudinal rows, and said means for selectively positioning said pins includes a first set of cylinders for moving one of said lateral rows of span pins to the predetermined location, and a second set of cylinders for moving one of said longitudinal rows of span pins to the predetermined location.

References Cited
UNITED STATES PATENTS

| | | | |
|---|---|---|---|
| 3,082,966 | 3/1963 | Frederick | 242—1.1 |
| 3,102,696 | 9/1963 | Larsh | 242—1.1 |
| 3,193,208 | 7/1965 | Brueggemann | 242—1.1 |
| 3,347,474 | 10/1967 | Frank | 242—1.1 |

BILLY S. TAYLOR, Primary Examiner

U.S. Cl. X.R.

74—96, 815